United States Patent
Effler et al.

(10) Patent No.: US 8,619,849 B2
(45) Date of Patent: Dec. 31, 2013

(54) DIGITAL PULSE WIDTH MODULATOR

(75) Inventors: Simon Effler, Speyer (DE); Mark Keith Halton, Annacotty (IE)

(73) Assignee: University of Limerick, Limerick (IE)

( * ) Notice: Subject to any disclaimer, the term of this patent is extended or adjusted under 35 U.S.C. 154(b) by 673 days.

(21) Appl. No.: 12/837,175

(22) Filed: Jul. 15, 2010

(65) Prior Publication Data

US 2011/0012687 A1    Jan. 20, 2011

(30) Foreign Application Priority Data

Jul. 16, 2009    (EP) .................................... 09394020

(51) Int. Cl.
H03K 7/08    (2006.01)
(52) U.S. Cl.
USPC ............ 375/238; 375/295; 332/106; 332/109
(58) Field of Classification Search
USPC .......................... 375/238, 295; 332/106, 109
See application file for complete search history.

(56) References Cited

U.S. PATENT DOCUMENTS

| 7,161,332 | B1 | 1/2007 | Kleine et al. | |
|---|---|---|---|---|
| 7,685,441 | B2* | 3/2010 | Burton et al. | 713/300 |
| 2006/0064609 | A1* | 3/2006 | Bryan | 714/700 |
| 2007/0013350 | A1 | 1/2007 | Tang et al. | |
| 2007/0109825 | A1 | 5/2007 | Qiu et al. | |
| 2007/0262802 | A1 | 11/2007 | Huard et al. | |
| 2008/0159380 | A1* | 7/2008 | Kris | 375/238 |
| 2008/0310200 | A1 | 12/2008 | Maksimovic et al. | |
| 2009/0016424 | A1* | 1/2009 | Latham et al. | 375/238 |
| 2009/0184742 | A1* | 7/2009 | Kris | 327/160 |
| 2010/0301826 | A1* | 12/2010 | Moussaoui et al. | 323/285 |
| 2012/0062290 | A1* | 3/2012 | Kenly et al. | 327/156 |

FOREIGN PATENT DOCUMENTS

EP    1988624 A2    11/2008
WO    2009076540 A1    6/2009

OTHER PUBLICATIONS

Effler et al., "Automated Optimization of Generalized Model Predictive Control for DC-DC Conversion," Proc. IEEE Electronics Specialists Conference; 2008. Retrieved from the Internet; (abstract only).

* cited by examiner

Primary Examiner — Siu Lee
(74) Attorney, Agent, or Firm — K&L Gates LLP

(57) ABSTRACT

The invention provides a multi-phase digital pulse width modulator (MP-DPWM) to implement a distribution scheme which applies the duty cycle in the fastest possible manner with restriction on the number of switching actions per phase and cycle, and additionally takes the number of available phases into account. It modulates switching signals according to a duty cycle input command, their previous switching states, and the current switching cycle. The controller is adapted to additionally take the residue of the previous subcycle into account. In the control scheme:
 each phase is allowed switch up to twice per cycle;
 only the next phase in the cycle is additionally turned on, at the start of a subcycle, and
 if a phase is still on at the end of a subcycle it can be kept on for longer, if required.

16 Claims, 12 Drawing Sheets

DIGITAL PULSE WIDTH MODULATOR

REFERENCE TO RELATED APPLICATIONS

This application claims priority to and the benefit of EP Application No. 09394020.3, filed on Jul. 16, 2009.

FIELD OF THE INVENTION

The invention relates to multi-phase digital pulse width modulators (MP-DPWMs) for the use in applications such as switch-mode power supplies.

BACKGROUND TO THE INVENTION

With switched-mode power supplies (SMPSs) moving to higher output power and smaller output voltages, the need for multi-phase power converters is continuously growing. With an increasing number of phases, the benefits of a control loop bandwidth closer to or even higher than the switching frequency of the individual phases are well-acknowledged. As simple digital pulse width modulators (DPWMs) are still used in current multi-phase designs, these tend to be one of the limiting factors of the loop bandwidth, and hence the need for improved "smart" DPWMs is clearly evident. Additionally, most of the existing architectures are not able to drive a varying number of phases which is required in systems with phase shedding operation.

Standard multi-phase power converters typically comprise of N phases, use N conventional DPWM modulators to generate the control signals for the power stage switches. Synchronisation between the individual modulators ensures proper phase shift. Naturally sampled DPWMs update the duty cycle once per switching cycle, which allows the update of the inputs of the modulator up to N-times the phase switching frequency. However, each individual DPWM is only updated once per cycle leading to additional problems such as current mismatch during load transients. Most designs overcome these issues by limiting the loop bandwidth, and thereby compromising the system performance.

For single phase applications, this issue has been addressed using several different concepts, such as charged-balanced control, linear-non-linear control, and multi-sampled DPWMs. However to date, these concepts have not been applied to multi-phase applications. As a consequence, multi-phase converters are still driven by standard multi-phase modulators.

A modulation output of a four-phase MP-DPWM is shown in FIG. 1. For each subcycle (Latin numbering), the duty cycle (values shown below the waveform) is applied to the currently active DPWM. While the system respects the number of allowed switching operations per cycle intrinsically, the delay in the application of the duty cycle and the resulting distribution of the output signal is not satisfactory. For the given example, the phases zero and three would take most of the transient current leading to a large current mismatch immediately after the transient. The delay between the reception of the duty cycle command and the application to the power stage can be up to one full DPWM cycle.

U.S. 2008/0310200 describes a multi-phase modulator, in which a decoder and a selector determine first, second, ad third sets of the multiple phases to place in first, second, and third states based on a digital input command. The input signal is split into MSBs and LSBs in an approach which could be referred to as static decoding.

PCT Patent publication number WO2009/076540, Primarion Corp, discloses a multiphase power regulator that operates in conjunction with an active transient response (ATR) system for applying a correction signal to a multiphase pulse width modulator. In the event of a transient, the ATR system may adjust the output of the pulse width modulator to quickly respond to load requirements. The output may be modified by adding pulses, blanking pulses, advancing pulses, and scaling pulses to one or more phases.

U.S. Patent publication number U.S. 2007/109825, Weihong et al, discloses an adaptive pulse positioning system for a voltage converter providing an output voltage, the system including a PWM generation circuit, a sensor, and a pulse positioning circuit. The PWM generation circuit generates a PWM signal with PWM pulses for controlling the output voltage of the voltage controller. The sensor senses an output load condition of the voltage converter and provides a load signal indicative thereof. The pulse positioning circuit adaptively positions the PWM pulses based on the load signal.

U.S. Patent publication number U.S. 2007/262802, Doug et al, discloses a voltage regulator for microelectronic devices using dual edge pulse width modulated control signal. In one example a first digital duty cycle value is received from a voltage controller and a pulse width modulated waveform is generated in response to the first duty cycle value, the waveform comprising of a plurality of pulses with a modulated width. The waveform is applied to a voltage generator to generate a supply of power at a voltage determined by the duty cycle of the waveform. A second digital duty cycle value is received from the controller, and the leading edge of a subsequent pulse of the waveform is advanced if the second digital duty cycle value is greater than the first digital duty cycle. The trailing edge of the subsequent pulse of the waveform is advanced if the second digital duty cycle value is less than the first digital duty cycle value.

The invention is directed towards providing an improved multi-phase digital pulse width modulator.

SUMMARY OF THE INVENTION

According to the invention, there is provided, as set out in the appended claims, a multi-phase digital pulse width modulator (DPWM) comprising:

a plurality of modulator phases incorporating a duty cycle control, operating over a number of subcycles; and a controller adapted to implement a distribution scheme which controls the duty cycle and number of switching actions per phase and switching cycle by taking the number of available phases into account, wherein each available phase is adapted to switch up to twice per switching cycle, such that only the next available phase in the next subcycle is additionally turned 'on', and if a phase is still on at the end of a subcycle, the phase is kept 'on', if required.

The invention provides a new multi-phase DPWM scheme is presented addressing the issues outlined above. The multi-phase DPWM provides good hardware utilization, limits the number of switching actions per phase and cycle and supports phase shedding.

In one embodiment, the controller is adapted to modulate switching signals according to a duty cycle input command, their previous switching states, and the current switching cycle.

In one embodiment, the controller takes into account a dynamically changing number of available phases (phase shedding).

In one embodiment, the controller is adapted to additionally take the residue of the previous subcycle into account.

The residue can be defined as part of the duty cycle which has not been applied in the current switching cycle and is therefore forwarded into the next subcycle.

In one embodiment, in the control scheme:
each phase is allowed switch up to twice per switching-cycle;
only the next phase in the cycle is additionally turned on, at the start of a subcycle, and
if a phase is still on at the end of a subcycle it can be kept on for longer, if required.

In one embodiment, the controller is adapted to apply duty cycle commands such that the last phase turned on is preferred.

In one embodiment, the phase before the next previous phase remains active only if the entire subcycle period of the last previous phase is used.

In one embodiment, the controller is adapted to turn on more than one phase at the start of each subcycle, if it can be ensured that these phases are kept on to avoid an additional switch off and on in the same cycle.

In one embodiment, the controller is adapted to turn on two phases if it can be ensured that the second turned on phase is kept on until the start of the next subcycle.

In one embodiment, the controller is adapted to turn on N phases at the start of a subcycle, if it can be ensured that Nth turned on phase is kept on until the start of the next (N−1) subcycle.

In one embodiment, the controller comprises of input logic, a one-phase finite-state-machine per each controlled phase, a cyclic-counter unit, and a timing block.

In one embodiment, the input logic, according to the number of available phases, ensures the normalization of the input signal; and wherein the input logic computes intermediate values required by the finite state machines, which are a separation of the duty cycle into a number of full subcycles and a high resolution modulation signal based on the number of available phases.

In one embodiment, all finite state machines are executed at the start of each subcycle to evaluate the current situation and take appropriate action, and each finite state machine can change its state at the beginning of a subcycle.

In one embodiment, if the phase is in the modulation state (Mod), the output is modulated with an auxiliary high-resolution DPWM module which is shared among all phases.

In one embodiment the modulator is adapted to cooperate with a comb filter.

In another aspect, the invention provides a switched mode power supply comprising of switches and an MP-DPWM as defined above in any embodiment controlling the switches. In one embodiment, in the power supply is a multi-phase buck converter.

In one embodiment there is provided a controller for use in a multi-phase digital pulse width modulator comprising of a plurality of modulator phases incorporating a duty cycle control, operating over a number of subcycles; said controller adapted to implement a distribution scheme which controls the duty cycle and number of switching actions per phase and switching cycle by taking the number of available phases into account, wherein each available phase is adapted to switch up to twice per switching cycle, such that only the next available phase in the next subcycle is additionally turned 'on', and if a phase is still on at the end of a subcycle, the phase is kept 'on', if required.

In one embodiment there is provided a method of controlling a multi-phase digital pulse width modulator, said method comprising of the steps of:
a plurality of modulator phases incorporating a duty cycle control, operating over a number of subcycles; and
implementing a distribution scheme which controls the duty cycle and number of switching actions per phase and switching cycle by taking the number of available phases into account, wherein each available phase is adapted to switch up to twice per switching cycle, such that only the next available phase in the next subcycle is additionally turned 'on', and if a phase is still on at the end of a subcycle, the phase is kept 'on', if required.

BRIEF DESCRIPTION OF THE DRAWINGS

The invention will be more clearly understood from the following description of some embodiments thereof, given by way of example only with reference to the accompanying drawings in which.

DETAILED DESCRIPTION OF THE INVENTION

The invention provides a multi-phase digital pulse width modulator (MP-DPWM) which achieves a fast execution of the duty cycle command with respect to the number of allowed switching actions per phase, and the switching cycle is as fast as possible. A particularly advantageous aspect is that the MP-DPWM of the invention uses dynamic decoding based on the number of available phases, supporting "phase shedding", as described in more detail below.

The system turns on one phase at the start of each subcycle, if required. If phases from the previous cycle remain on, they can be kept on "for longer". Dependent on the expected input signals two different scenarios are now possible:

(A) The applied duty cycle can be split evenly among all phases currently on. While this applies the duty cycles as fast as possible, it will spread the input signal unevenly over more subcycles. Also the phases will only stay active until the end of a subcycle provided that the input value is larger than the applicable value. This scheme is favourable for input signals which are relatively large for only one or two subcycles.

(B) The second scenario prioritises the duty cycle application in such a way that the phase turned on last is preferred. As a result, the second-last phase will remain active, only if the entire subcycle period of the last phase is used. This enables a more even distribution of the duty cycle over the full switching cycle, i.e. the phases. Also this option keeps as many phases as possible turned on until the end of the subcycle, which is an advantage for the next subcycle if the duty cycle input commands remain larger for more than a single subcycle. As a consequence, this distribution scheme is favourable for applications where medium to large duty cycle commands are expected over a number of cycles.

Distribution Principle

The scheme distributes the duty cycle over the phases, respecting the following criteria:

Each phase is exactly allowed to switch twice per cycle (on once, off once).

Only the next phase in the cycle is additionally turned on.

If a phase is still on at the end of a subcycle, it can be kept on for "longer".

Phase shedding and alignment are respected.

Figure 1:
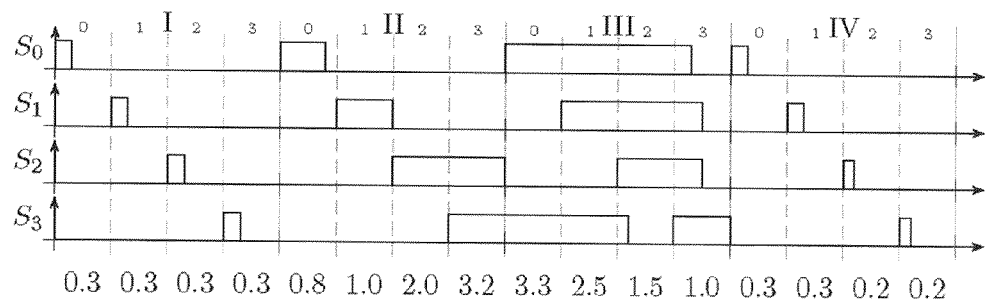
FIG. 1 is a plot illustrating operation of a conventional MP-DPWM.
Figure 2A:
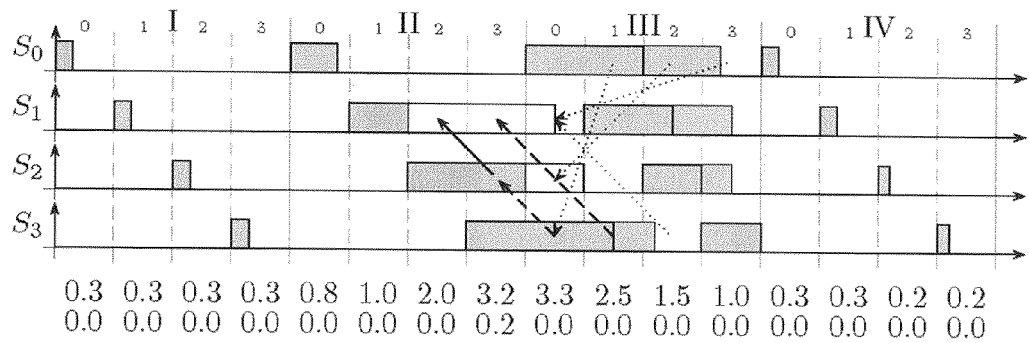
FIGS. 2(a) and 2(b) are plots illustrating duty cycle distribution for an MP-DPWM of the invention.
Figure 2B:
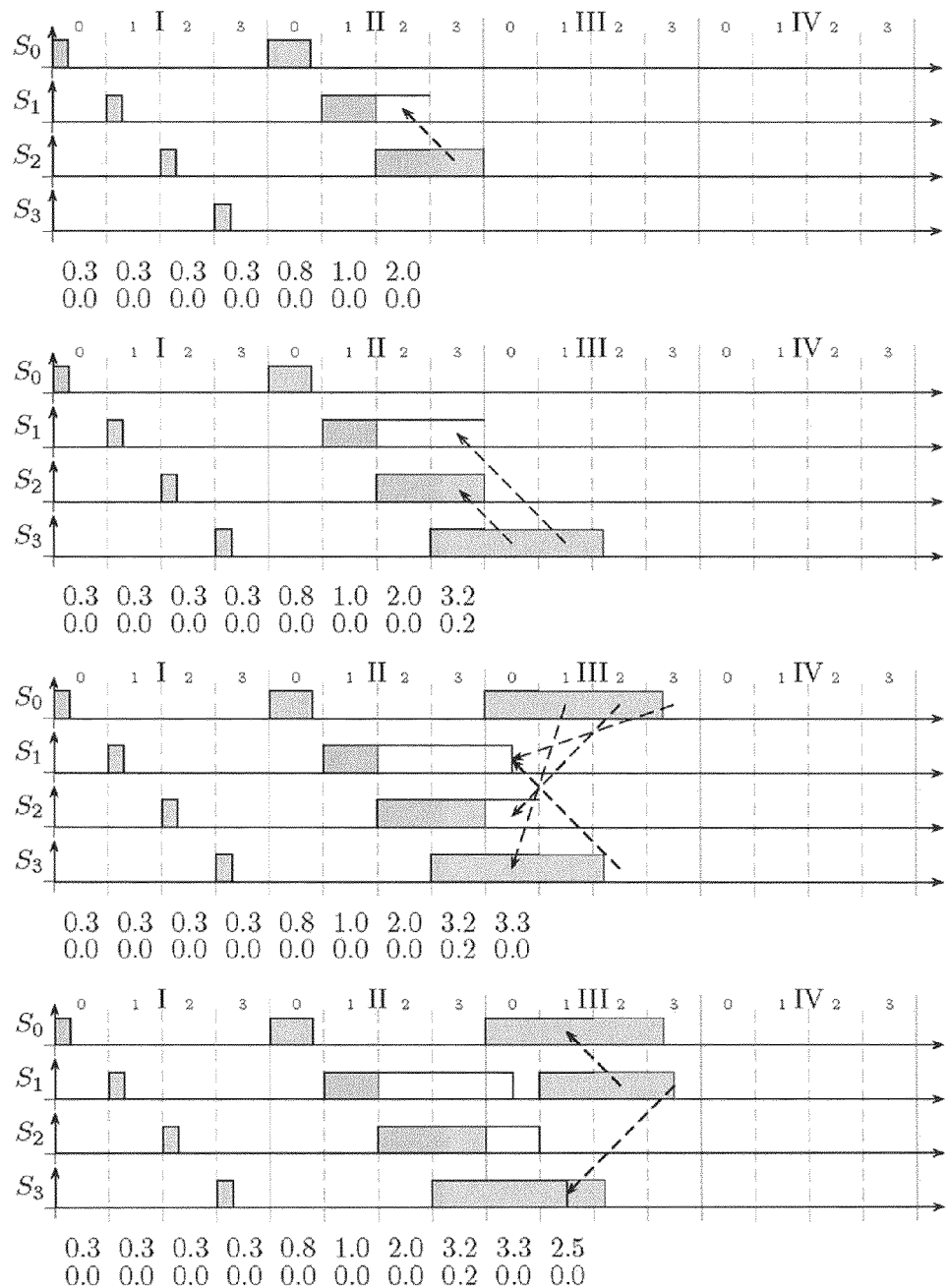

Adhering to these criteria leads to a distribution of the duty cycle as shown in FIG. 2(a), where the standard duty cycle is shaded for comparison purposes and dark lines show the duty cycle of the system of the invention in one embodiment. As before, the duty cycle input command for each subcycle is listed in the first line below the waveform, while the second line represents the residue forwarded to the next subcycle. The arrows illustrate the redistribution of the duty cycles among the phases compared with a standard modulation scheme. To further illustrate the timing, a step-by-step version of the drawing is shown in FIG. 2(b).

Mathematically, the duty cycle $D_{n,k}$ for each phase n and time instant k can be calculated from the duty cycle input $D_k$ as $$D_{n,k} = \begin{cases} 0, & \text{if } D_{n,k-1} \neq \frac{1}{N} \text{ and } i \neq 0, \\ \min\left(\frac{1}{N}, \max\left(o, D_k - \frac{i}{N}\right)\right) & \text{otherwise} \end{cases} \quad (1.1)$$

where $D_{n,k}$ is the duty cycle for each phase n and time instant k, $D_k$ is the duty cycle input command and i=(k+n) mod N. N is the number of phases, which is passed to the DPWM as a parameter depending on the current operation conditions (phase shedding).

This mathematical description is suitable for modeling at a high level of abstraction where complex mathematical operations create no computational burden. A further reduction of computational complexity is now described leading to a much simpler mathematical description of the problem suitable for hardware implementation.

When the distribution principle is analysed, it reveals the following characteristics:

1. The duty cycle is distributed over the phases with the highest priority given to the phase turned on last and with the priority dropping with increasing "turn-on" time. If the conventional output signal are substituted with priority-encoded signals $P_{n,k}$, each signal can be computed by a fixed equation. These signals are then mapped to the output signals by a rotary encoder dependent on the current subcycle and number of available phases.

2. If more than one phase is on at the same time, the maximum of one phase requires a modulation of the output signal within the current subcycle.

The duty cycle $D_k$ of the interval k can be converted into the priority-encoded signals using $$P_{n,k} = \begin{cases} 0, & \text{if } P_{n,k-1} \neq \frac{1}{N} \\ \min\left(\frac{1}{N}, \max\left(o, D_k - \frac{n}{N}\right)\right), & \text{otherwise,} \end{cases} \quad (1.2)$$

where the priority is represented by n=[0N−1] with the highest priority given to n=0.

This equation can be further simplified by analysing a second property of the switching signal. It can be observed that the modulator is allowed to 1. turn exactly one phase on at the beginning of the subcycle,
2. turn exactly one phase off during the subcycle and
3. turn off as many phases as required at the end of the subcycle.

This transforms the description of the problem to a search for the optimal number of active phases during each subcycle. To do so, the system assesses the situation at the beginning of each subcycle, decides how many phases need to be active based on the previous number of active phases and the currently required number of active phases extracted from the duty cycle input command.

To ease the calculation of the optimal number of phases, the problem is split into two subproblems. The number of required "fully turned on" subcycles is determined and the remaining duty cycle is used to calculate the modulation of the phases turned off during the cycle. This is done by a simple hardware implementation of the following equations:

$$D_k = D_{in,k} + R_k - 1 \quad (1.3)$$

$$F_k = F_{k-1} + G_{k-1} + D_k \, div \, 1/N \quad (1.4)$$

$$L_k = D_k \, mod \, 1/N \quad (1.5)$$

$$R_k = L_k - M_k \quad (1.6)$$

where $D_{k,in}$ is the current duty cycle input command, $R_{k-1}$ the residue of the previous subcycle, $F_K$, $F_{k-1}$ the number of required subcycles of the current/previous interval, $G_{k-1}$ the applied subcycles during the last interval, $L_k$ the subcycle modulation and $M_k$ the applied subcycle modulation during the last subcycle.

Although these equations look very complex, their actual implementation is straightforward. If scaling to the power of two is selected and N fixed, the modulo operation is equivalent to a truncation of bits. As N is not a fixed value here, rather it is a value from a fixed selection, a simple truncation is not sufficient and a "real implementation" of the modulo operation is required. However, this can be implemented as a serial operation, using a simple recursive subtracter unit, where the number of required cycles is defined by the maximum ratio between the dividend, iDC, and the divisor, 1/N.

The decision regarding the number of active phases is now dependent to the inputs $F_k$, $L_k$ and on the current number of active phases $n_{a,k-1}$ at the end of the previous subcycle. An analysis of the system results in the following equation used to calculate the number of active phases $n_{AP,k}$ at the beginning of each subcycle k.

$$n_{AP,k} = \begin{cases} \min(N-1, n_{AP,k-1} = 1), & \text{if } n_{AP} \le F_k \\ F_k, & \text{otherwise,} \end{cases} \quad (1.7)$$

If the required number of full subcycles $F_k$ is fully applied and if a modulation of the remaining signal is required (which is the case if $F_k < n_{AP,k}$), the number of active phases is reduced by one during the subcycle.

Phase Shedding

The support of phase shedding, i.e. the dynamic change in the number of available phases during operation, is a very advantageous feature of the invention in some embodiments. Individual phases are commonly shed to improve the efficiency of the overall system during medium and light load conditions.

In the scheme, several properties change with the number of phases: the maximum number of available phases N, the duration of each subcycle 1/N and the phase shift between the individual switching signals $\phi=1/N$ If the underlying equations are implemented in such a way that N (1/N) is treated as a parameter, no additional measures are required. Depending on the current operation condition, the number of active phases N is selected from the interval [1 $N_{max}$] by an external configuration signal.

As a further requirement, a backend rotary encoder mapping the priority signals back onto the actual output signals must respect the total number of phases $N_{max}$ and the number of currently available phases N.

Alternative Modulation Schemes

Alternative modulation schemes are also possible. One such scheme is based on the following consideration: "Is it possible to turn on more than one phase at the start of a subcycle while still limiting the number of switching actions?"

In order to turn on more than one phase per subcycle, the system has to ensure that a sufficient duty cycle needs to be applied so that the particular phase does not need to be switched off prior to its regular switching edge. A clear performance increase is achieved for the cases, where only a small number of phases (e.g. one) is active at the beginning of a subcycle. Some minor advantages can be expected in the cases where one additional phase can be turned on, which is the case when the number of required subcycles $F_k$ exceeds the number of currently active phases by more than two, i.e. cases (0,2) and (1,3).

Cases where more than two phases can be turned on at the same time occur very rarely and are subject to tight restrictions on the duty cycle command. Therefore the additional hardware required does not justify the small improvement in performance.

Results

Figure 3:
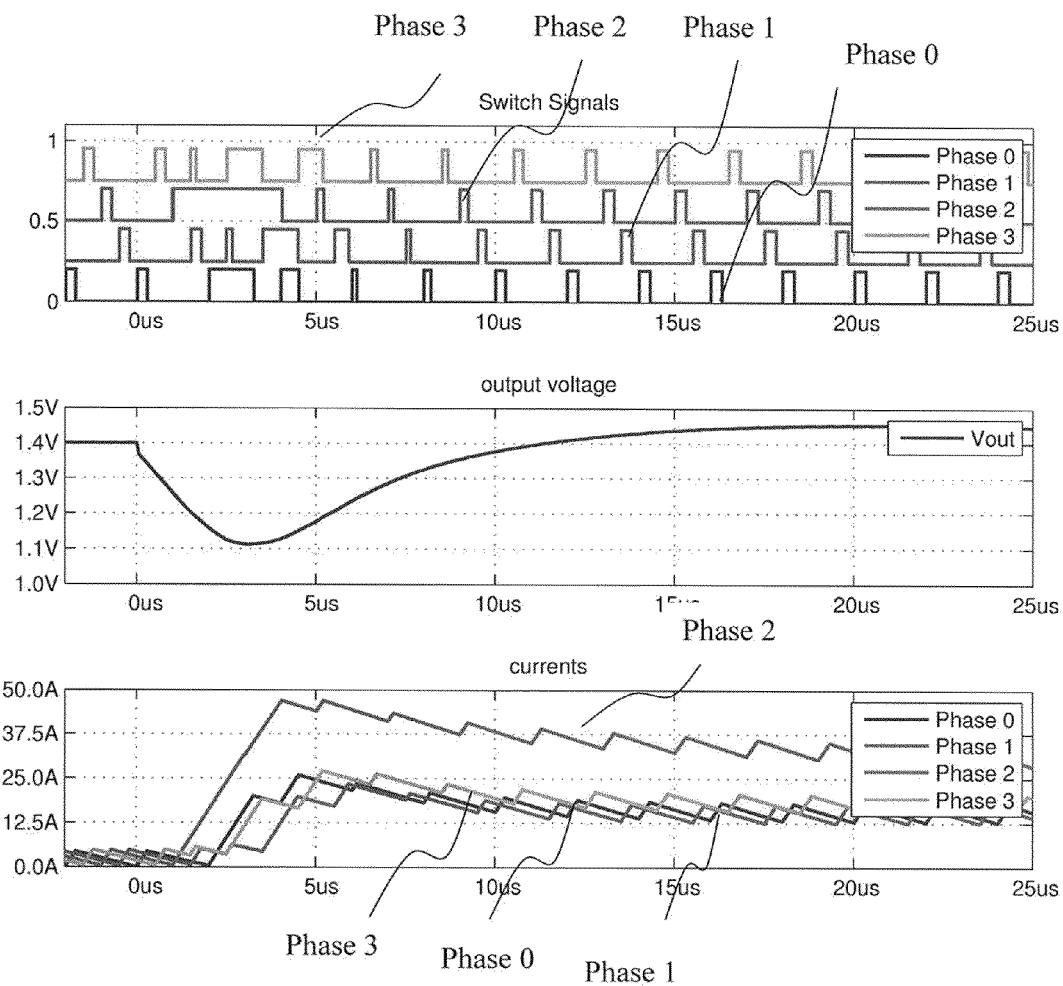
FIGS. 3 and 4 show simulation results for a prior art reference MP-DPWM and for a MP-DPWM of the invention.
Figure 4:
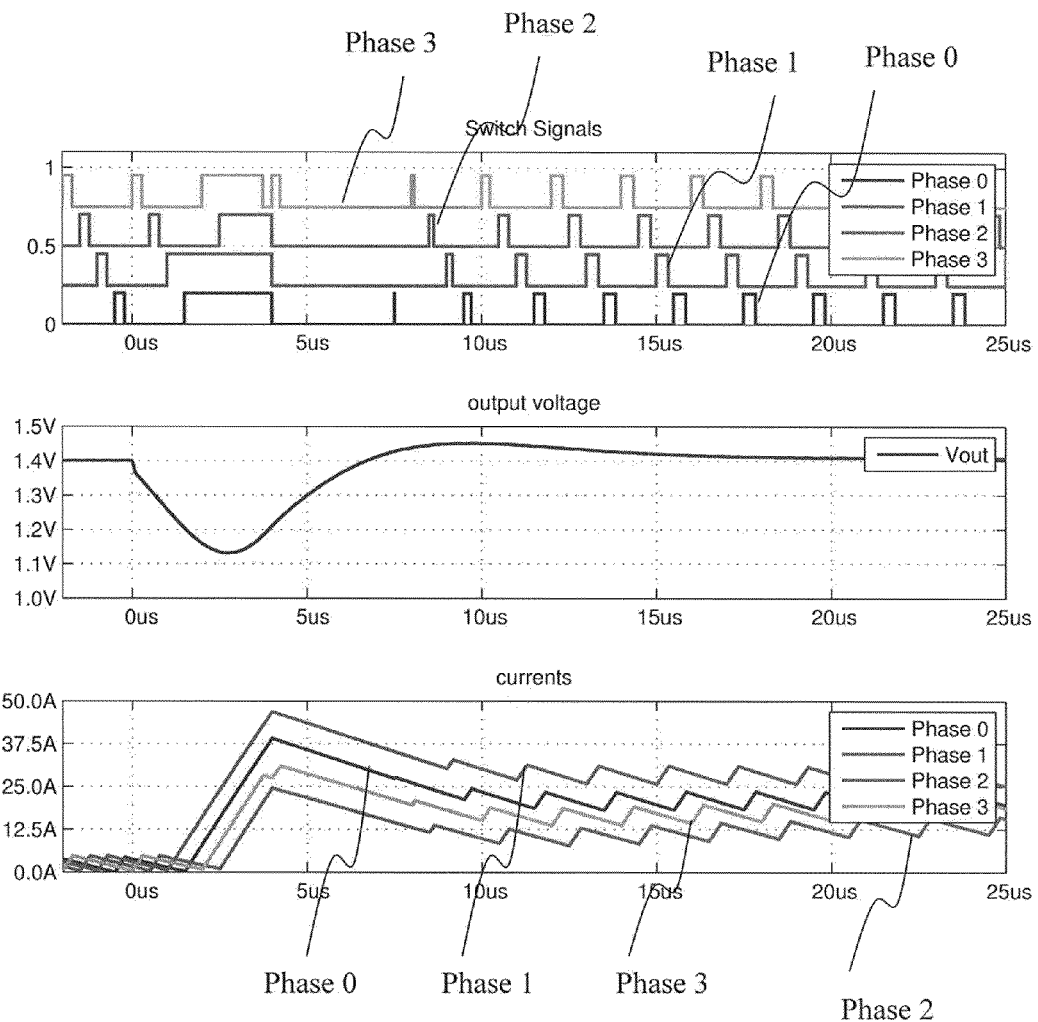

Results obtained of a standard DPWM implementation and the AM-DPWM of the invention are compared, with reference to FIGS. 3 and 4.

A four-phase buck converter switching at 500 kHz per phase is used as a reference example with the full technical specifications listed in Table 1.1. The loop is compensated with a GPC designed compensator with design parameters $N_u=4$, $N_y=150$, $\lambda=250$ using the design process outlined in Simon Effler et al "Automated Optimization of Generalized Model Predictive Control for DC-DC Conversion", in *Proc. IEEE Electronics Specialists Conference PESC* 2008. URL: Literature/Papers/Effler_Automated_Optimization_ of_Generalized.pdf.

In FIG. 3 a 50A step response of this system is shown. The duty cycle is not limited, which results in more than one phase being on at the same time. This renders the standard transfer function model invalid and leads to an overshoot in output voltage. Also the phase currents are not shared satisfactorily, as only some phases take large inductor currents, due to larger duty cycle values. The initial mismatch of the inductor currents in this simulation is caused by the absence of a current sharing loop and would not occur in a "real" system design.

To model the MP-DPWM of the invention, an appropriate high-level representation in Matlab/Simulink/PLECS has been developed. Based on equation 1.1, the duty cycle for each phase and subcycle is calculated. These signals are applied to the phases by independent DPWM modulators that run at the total switching frequency instead of the "per-phase" frequency as they now represent the DPWM subcycles.

TABLE 1.1

Modulator details

| Component | Value |
|---|---|
| Switching frequency | 500 kHz |
| Sampling frequency | 2 MHz |
| Number of phases | 4 |
| Inductance per phase | 680 nH |
| RL per phase | 15 mΩ |
| Total output capacitance | 600 µF |
| ESR | 0.4 mΩ |
| Input voltage | 12 V |
| Output voltage | 1.4 V |
| Output power | 112 W |
| Total loop delay | 500 ns |

Simulation results for a 50A step response applied to the MP_DPWM of the invention are shown in FIG. 4 where the loop is again compensated with a GPC designed compensator using the above design process ($N_u=4$, $N_y=150$, $\lambda=150$). The first plot in FIG. 4 shows the resulting switching signals driving the power stage switches. The "glitches" during the large on-times are caused by the model of the DPWM modulator and will not appear in a real system. They can be neglected for this simulation as well, as they are infinitely small and have no effect on the results. From the output voltage and the inductor current response, the superior performance of the system over a conventional design is clear. Along with the improved transient response, the inductor currents are more uniformly distributed among the phases even without utilising an additional current sharing scheme.

The duty cycle is spread across the phases which then allows the use of a compensator with a higher loop bandwidth. "Faster" compensators provide larger duty cycle commands which contribute to the performance increase.

The duty cycle signal is a representation of the applied duty cycle as a standard DPWM input signal. The signal is obtained by tracking the subcycle duty cycle information per phase over a full switching period which is then "backdated" by one cycle. The backdated sum can be interpreted as a representation of the new DPWM modulation signal in conventional duty cycle format. The full benefits of the AM-DPWM can only be utilized with a high bandwidth control loop. While this bandwidth can be achieved with linear compensators, it is expected that non-linear compensators should prove more beneficial.

VLSI Implementation

Figure 5:
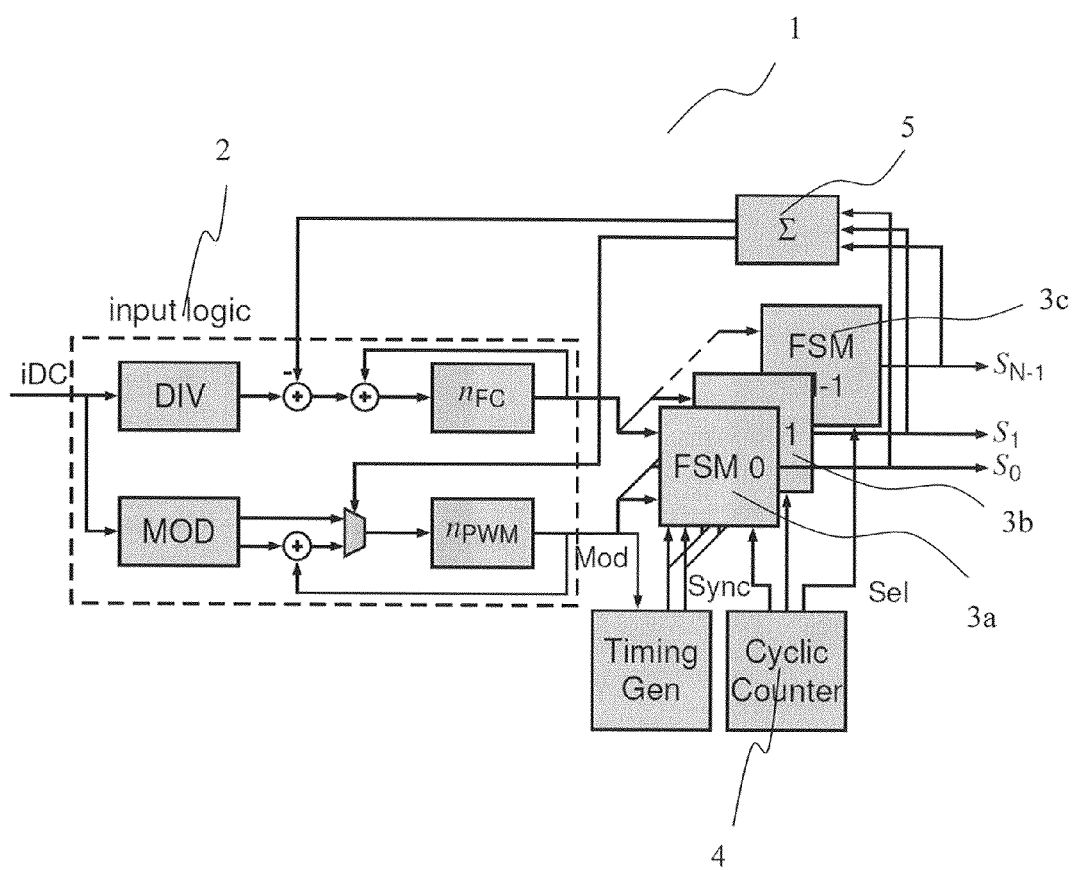
FIGS. 5 and 6 are diagrams for FSM control of the MP-DPWM of the invention.
Figure 6:
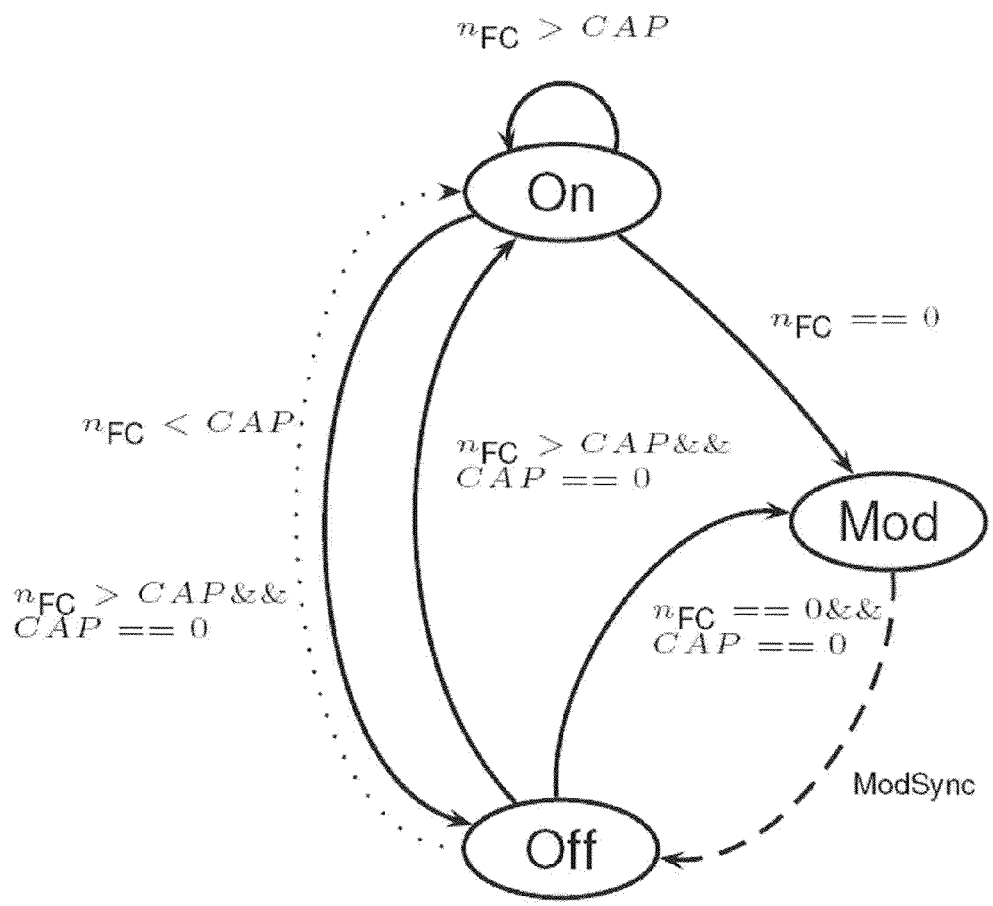

An implementation of the modulation scheme is shown in FIGS. 5 and 6. It utilises "phase state machines" and is a direct implementation of equation 1.1. It is implemented in Verilog HDL.

Referring to FIG. 5 the system, indicated generally by the reference numeral 1, comprises of an input logic block 2, one phase finite-state-machine (FSM) per each controlled phase, $3_a$, $3_b$ and $3_c$, a cyclic-counter unit 4 and a shared high-resolution DPWM module. The input logic computes the intermediate values required by the phase FSMs and incorporates three features: Integral action ensures the proper application of the duty cycle input commands to the phases; Separation of the number of full subcycles and the high-resolution modulation signal reduces the area of the FSMs and simplifies the implementation of phase shedding logic; Sigma-delta modulation block 5 improves functionality of the effective resolution.

The FSM controls the output modulation of the phases where one FSM is required per phase. The implementation is relatively simple and independent of the number of available phases as this is handled by the input logic. The high-resolution DPWM block provides the synchronization signal for the subcycle timing and the inter-subcycle modulation for one phase if required.

The output signal of each phase is controlled by a small FSM, illustrated in FIG. 5. The state of each output signal is either:
  Off: The phase is switched off
  On: The phase is switched on for the entire subcycle.
  Mod: The phase is modulated during the subcycle.

All FSMs are executed at the start of each subcycle to evaluate the current situation and take appropriate action. Typically, a FSM changes its state at the beginning of a subcycle. If the phase is in the modulation state (Mod), the output is modulated with an auxiliary high-resolution DPWM module which is shared among all phases.

A separate control signal (CAP) provided by the cyclic counter unit is fed into each state machine controlling the current subcycle of each phase. The same signal is used to provide phase shedding by "freezing" the signal for all phases not in use. This is implemented as a tapped cyclic counter based on shift-registers without the need for many additional logic blocks.

To implement an alternative modulation scheme a small extension of the FSM is introduced (dotted line in FIG. 6). This additional transition turns on one additional phase one subcycle before its regular modulation if required. To simplify the overall implementation, this is executed in a pipelined operation. The output signals of all phases are calculated in a first step without additional "turn-on", while one extra phase can be turned on in a second step if still required.

One additional advantage of the proposed architecture of the invention is the scalability with the number of phases, as shown in Table 1.2 which shows are versus the number of phases:

TABLE 1.2

| # of phases | 3 | 4 | 6 | 8 |
|---|---|---|---|---|
| Standard DPWMs | 204 | 242 | 336 | 433 |
| AM-DPWM | 155 | 240 | 379 | 503 |

Parallel single phase DPWM (with common resynchronization logic) scale about linear with the number of phases. However, in order to achieve sufficient resolution most of today's designs will use a hybrid architecture using analog and digital components. This increases the required area and usually involves manual layout. The proposed architecture requires digital blocks only, despite one high-resolution DPWM module, and hence is fully synthesisable. The auxiliary units require a larger initial area compared to standard DPWMs with a break-even around four phases.

Loop Compensation

In order to test the performance of the proposed DPWM in closed loop operation, some additional digital blocks are required in a digital control loop. Namely, a loop compensator and, due to the nature of multi-phase power converters, current sharing functionality. In the following sections, these two blocks with their system specific implementation details and requirements are described.

Loop compensation techniques for power converters, both in the analog and the digital domain, are well-developed. A lot of research has been focused on several different techniques. One specific requirement should be taken into account, i.e. the dynamic change in the number of phases. The compensator must be able to control all plants arising from a varying number of phases which results in a modification of the power converter's transfer function.

Figure 7:
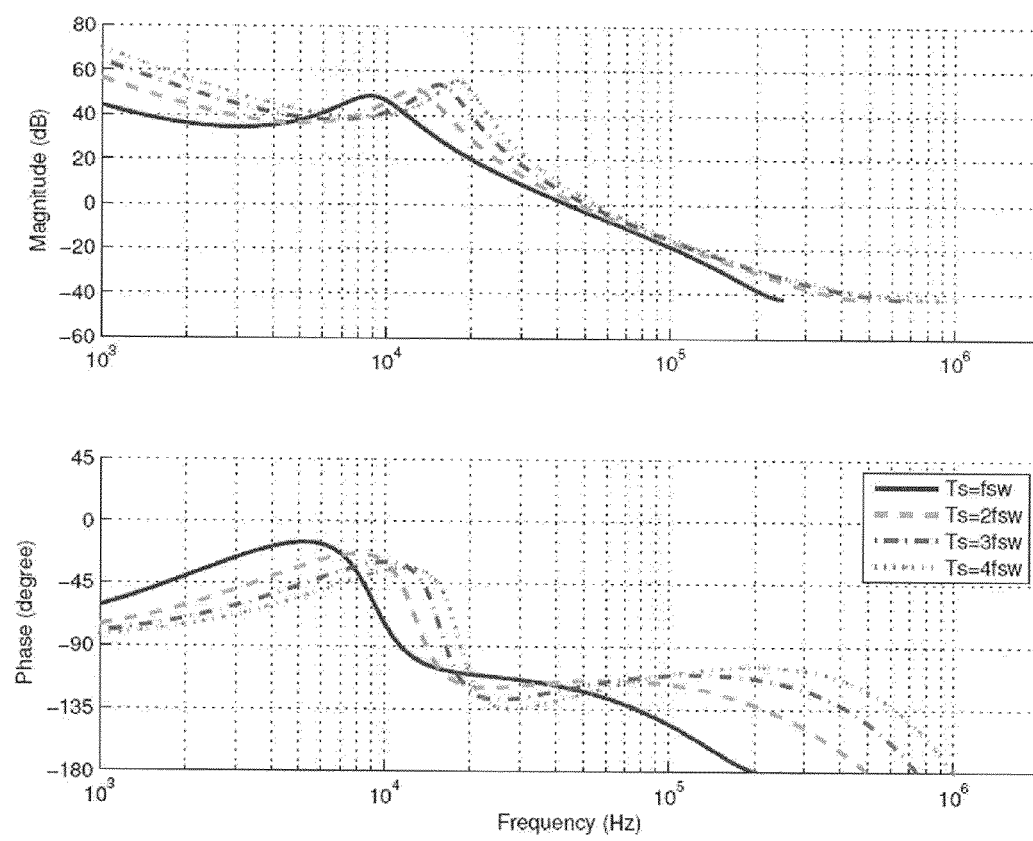
FIG. 7 illustrate bode plots of resulting open loop systems obtained.

This is caused firstly by a change of the equivalent circuit model and secondly by a change in sampling time. For demonstration purposes, a PID-based compensator, designed using standard design techniques proves sufficient. This compensator is "retimed" for different sampling frequencies by changing its clock frequency without a change in its coefficients. This can be viewed as a modification of the compensator in the time/frequency-domain due to a change of its discretization time/frequency. The compensator remains constant in the z-domain as the coefficients are not altered. Generally speaking, a change in the sampling frequency towards lower frequencies "slows" down the compensator and moves the corner frequency to the left. Bode plots of the resulting open loop systems are shown in FIG. 7. Note that the described technique proves sufficient for testing the proposed modulator. It is envisaged that more advanced compensation schemes, e.g. adaptive control techniques, will provide better performance In multi-phase power converters current sharing is a mandatory need, due to tolerances and mismatches between the individual phases. Different strategies have been investigated in the past and can be broadly categorized into two groups, i.e. active and passive techniques. Active techniques require current sensing of the individual inductor currents and distribute the current equally among the phases. Passive techniques do not require current sensing and can use alternative measures to estimate the phase current.

Figure 8:
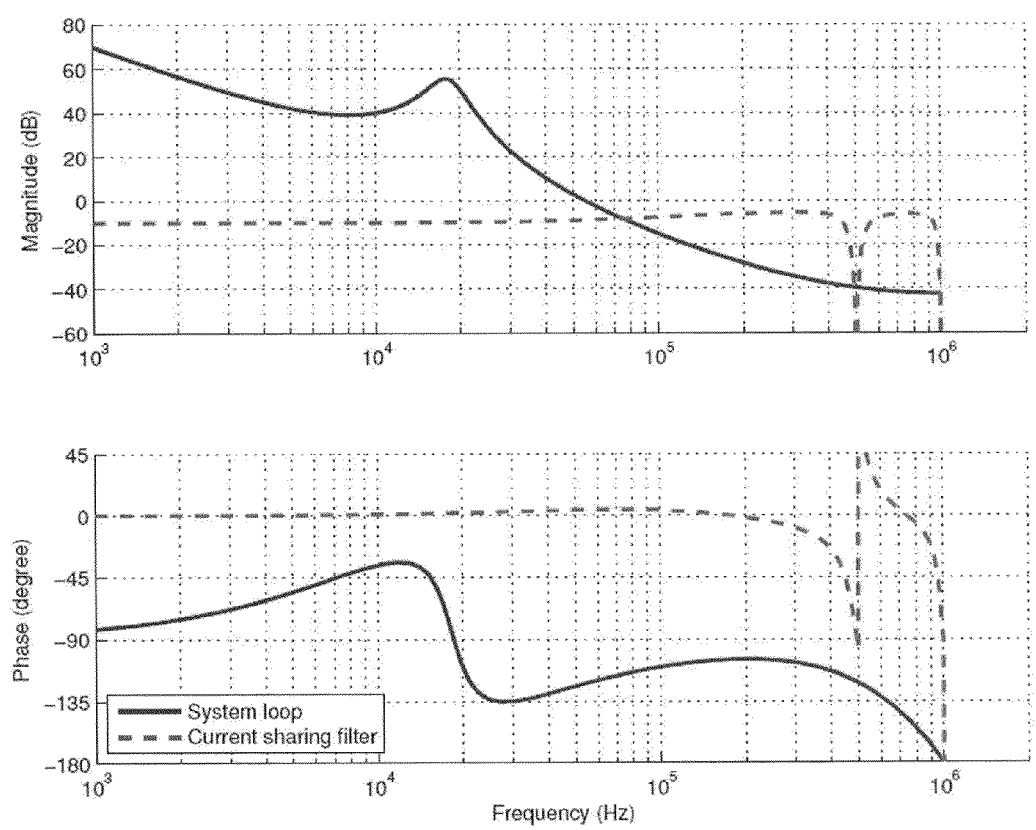
FIG. 8 illustrate bode plots of the filter's transfer function obtained.

To ensure duty cycle matching among the phases, several different techniques are available. However, all of them introduce additional delays into the control loop and hence degrade its performance. In order to achieve passive current sharing without phase delay, a comb-filter is inserted into the system loop which rejects signals (harmonics) at multiples of the switching frequency without delaying the control loop. The bode plot of the filters transfer function is shown in FIG. 8. One advantage of the proposed method is the decoupling of the design procedures of the current sharing filter and the loop compensator.

Figure 9:
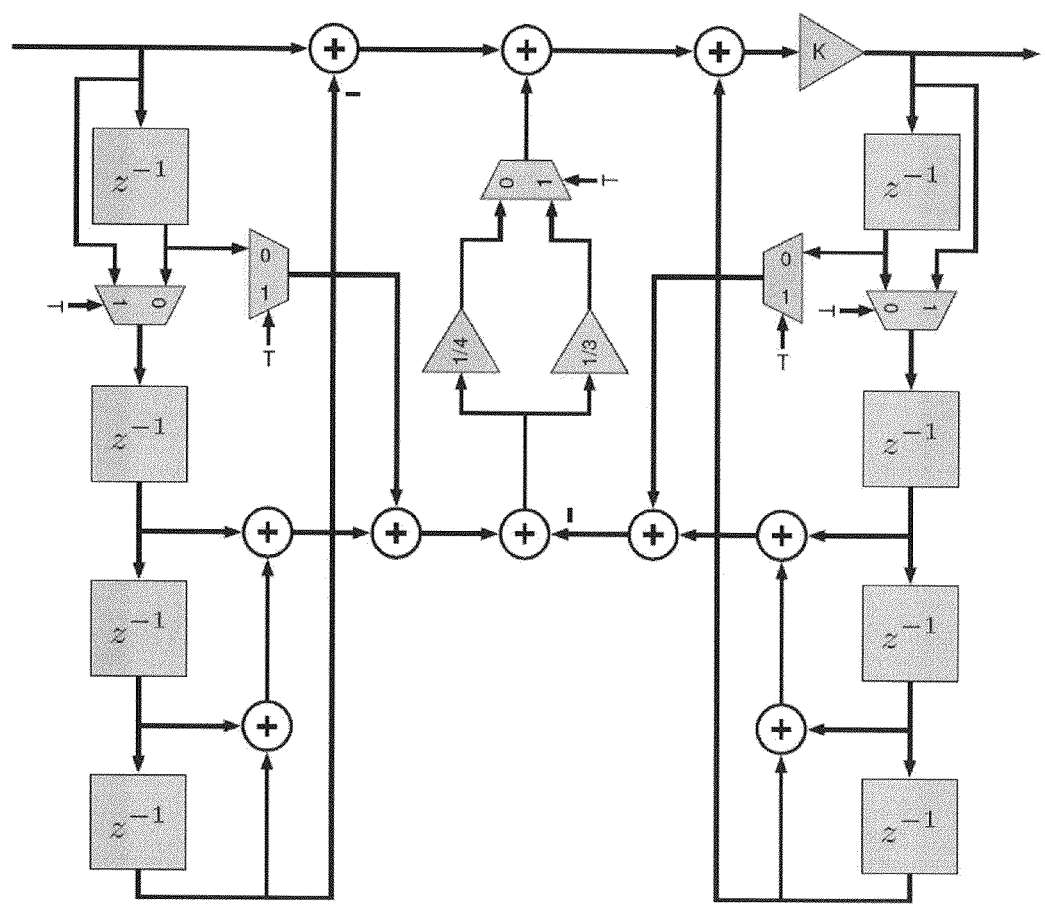
FIG. 9 illustrates a comb-filter design to be used in combination with the MP-DPWM, according to one aspect of the invention.

Additionally, the proposed comb-filter, as illustrated in FIG. 9, is simple to implement and does not required any dedicated multipliers. Adders and shifters are sufficient in practice. In one embodiment the comb filter comprises of five multiplexers and one additional gain stage (⅓). When the multiplexer control signal, T, is set to one, the filter is in third-order mode, otherwise it is in fourth-order mode. Like the loop compensator, the comb-filter is retimed when the number of phases is changed. Unlike the loop compensator, the comb filter requires some additional action during retiming. Note when the filter is retimed with any modifications, its rejection frequencies are shifted as they are relative to the sampling frequency, e.g. $\frac{1}{4}f_{sa}$ and $\frac{1}{2}f_{sa}$. However, in order to ensure proper current distribution, the rejection bands need to match the switching frequency and its harmonics. While four, two and one phase operation can be covered by one filter for harmonics at $\frac{1}{4}f_{sa}$ and $\frac{1}{2}f_{sa}$, different rejection bands are required for three phase operation. For this case, the harmonics are at $\frac{1}{3}f_{sa}$ and $\frac{2}{3}f_{sa}$. Subsequently, a small modification of the comb-filter from fourth-order into a third-order system is required to move the rejection bands into the correct positions.

Figure 10:
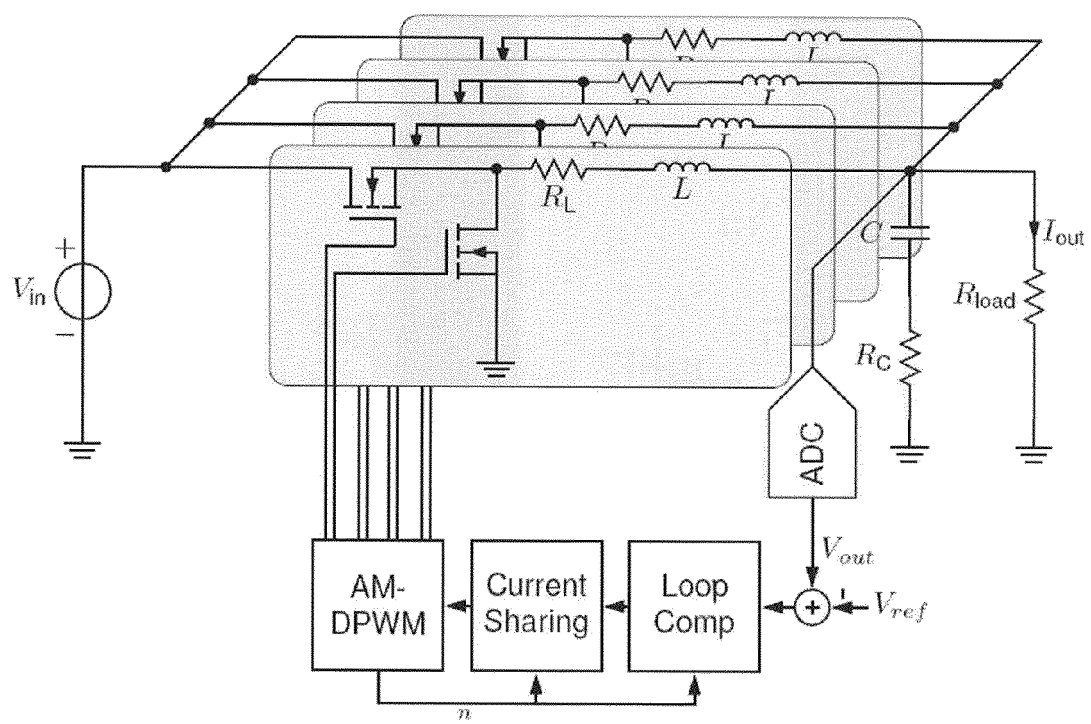
FIG. 10 consists of an N-phase power stage, an analog-digital-converter (ADC), a digital loop compensator (Loop Comp), current sharing, and a "smart" DPWM modulator (AM-DPWM)

It will be appreciated that the system of the present invention, as illustrated in FIG. 10, comprises of a N-phase power stage, an analog-digital-converter (ADC), a digital loop compensator (Loop Comp), current sharing, and a "smart" DPWM modulator (AM-DPWM), incorporating a new duty cycle distribution algorithm. The algorithm hereinbefore described is based on the fastest possible execution of the duty cycle commands while still ensuring that each phase switches only twice (on/off) per switching cycle. A dynamic number of active phases (phase shedding) is incorporated by design together with an optional sigma-delta functionality to improve the effective resolution.

Figure 11A:
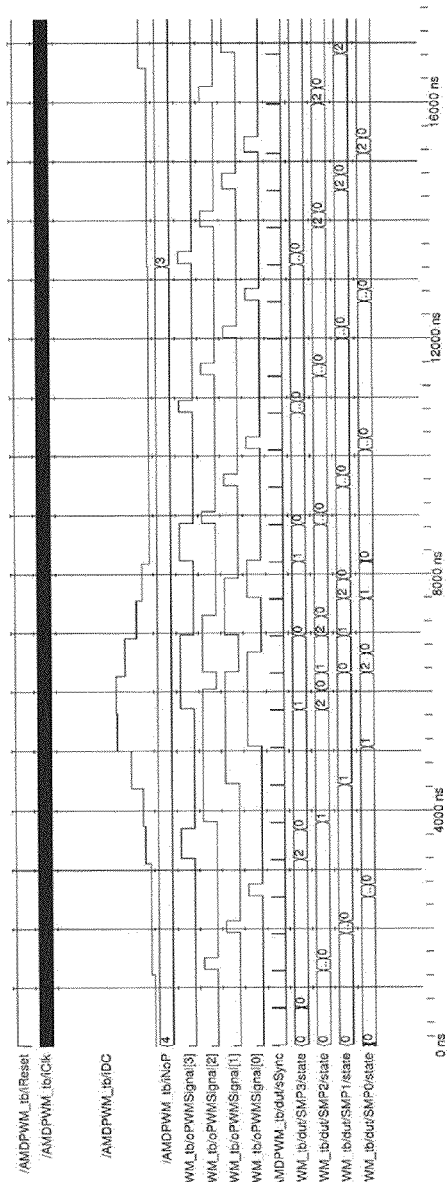
FIGS. 11(a) and 11(b) is a simulation waveform illustrating operation of a MP-DPWM of the invention.
Figure 11B:
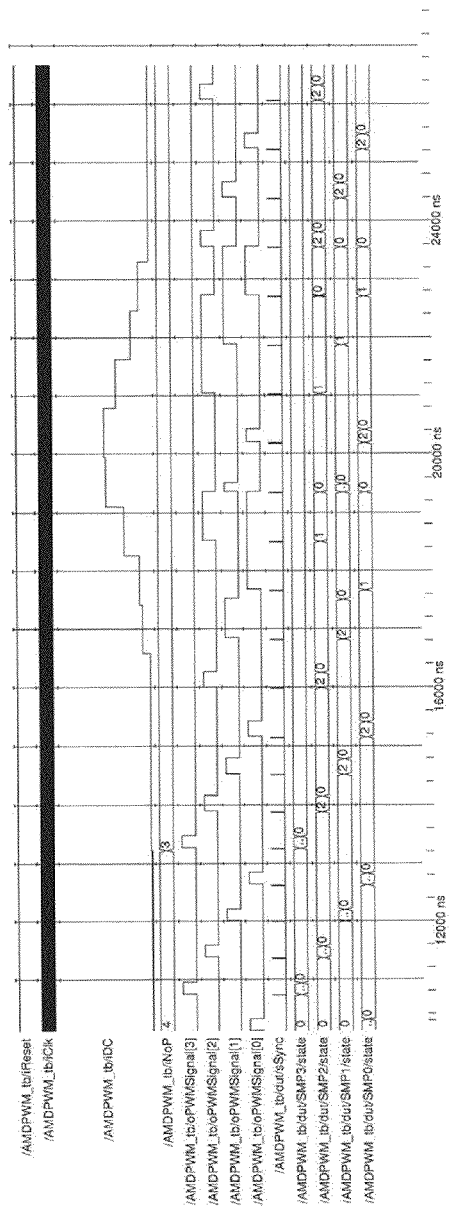

VLSI simulation results of the proposed implementation scheme are shown in FIG. 11. The duty cycle is applied in the same sequence as that in FIG. 2. The output signals oPWM-Signal[X] show the resulting modulator output signals, and the states of the FSMs (SMPx/state) that are in use where 0 represents "off", 1 "on" and 2 "mod". Signal sSync marks the start of a subcycle and iNoP represents the number of available phases. In FIG. 11(a) four phases are available to the modulator so that the resulting output sequence is identical to the case shown in FIG. 2. Continuing to FIG. 11(b), the number of available phases is now reduced to 3, while the same input command sequence is applied. The modulation output changes accordingly.

In another embodiment of the invention a four-phase buck converter with 500 kHz switching frequency per phase was built according to the modulator design hereinbefore described. The full technical details used were:

| TECHNICAL DETAILS |
| --- |
| Input voltage 12 V |
| Output voltage 1.5 V |
| Number of phases 1-4 |
| Phase switching frequency 500 kHz |
| Phase inductance 680 nH |
| Total output capacitance 450 μF |
| Total output power 120 W |

Figure 12A:
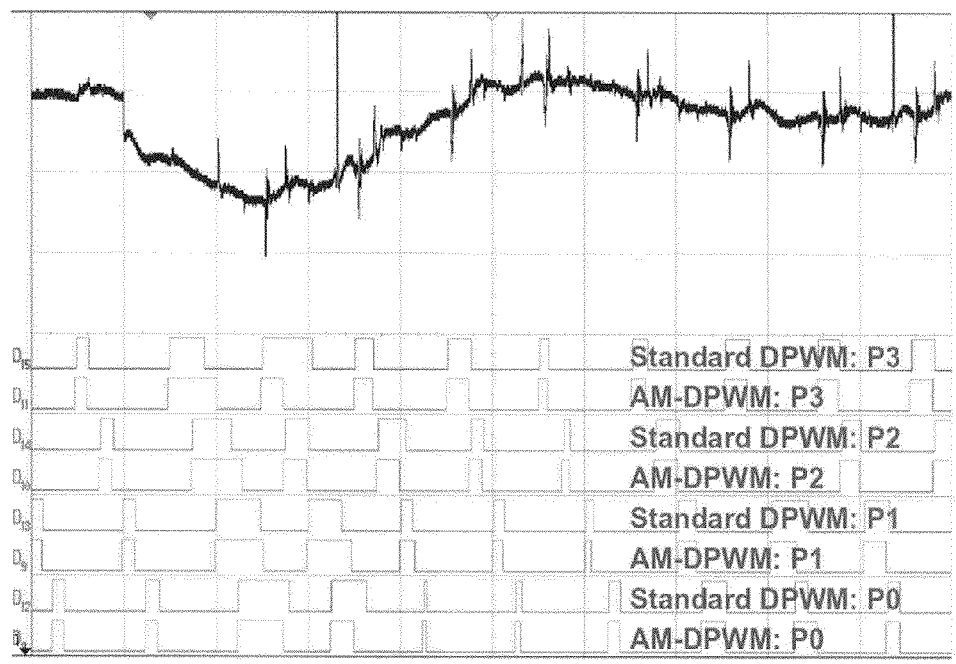
FIG. 12(a) System response of a MP-DPWM to a 70A load step with DPWM output signals according to one embodiment of the invention; (b) Phase shedding operation with a modulation scheme of the MP-DPWM.

In FIG. 12(a), the system's voltage response to a 70A load transient is shown. The respective digital control signals (DPWMs outputs) are shown, together with the output voltage as reference signal. Also the outputs of the standard DPWM ($D_{12}$ to $D_{15}$) and the new modulator ($D_8$ to $D_{11}$) are both shown in the same diagram, where only the latter set is used as switch control signals.

Using the new distribution algorithm, the transient response is improved by almost 40% compared to regular DPWMs. The maximum deviation is significantly reduced which is also due to an increase in the maximum loop gain. In this prototype, the gain of the standard DPWM loop is reduced by a factor of two compared with the new modulator, as a higher gain would cause a significant output voltage overshoot.

Figure 12B:
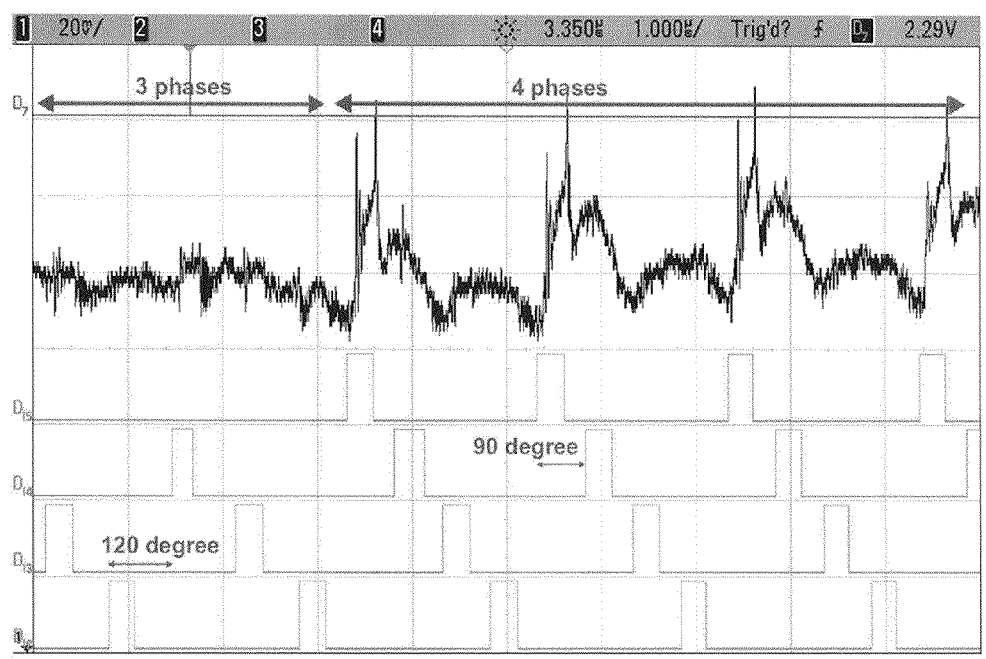

In FIG. 12(b), the behaviour of the DPWM during a phase shedding operation is shown. The number of phases is changed from three to four via an external control signal ($D_7$). The respective phase ($D_{15}$) is switched from tri-state mode into standard operation. At the same time, the phases are realigned with a phase shift of 90. The phase shedding procedure does not cause any perturbation of the output voltage due to the internal distribution scheme. Note that in FIG. 12 (output voltage resolution 20 mV/DIV), the unexpected increase in ripple voltage during the change in the number of phases is caused by the switching noise of the just-enabled phase as this is the nearest to the measurement probe.

It will be appreciated that the invention provides a multi-phase digital pulse width modulator which applies the duty cycle command as fast as possible with a restriction on the number of switching actions per phase and cycle. The switching signals are modulated based on the duty cycle input command, their previous switching states and the current switching cycle. The resulting performance exceeds the performance of prior art DPWM schemes and at the same time scales favourably with an increasing number of phases. The intrinsic support of more advanced features like phase shedding and current distribution completes the feature set.

In the context of the present invention the following definitions apply:

Total number of phases: The total number of phases the modulator can control.

Available phases: The number of phases currently available for modulation. The number is defined by an external control signal which can be dependent on output power, desired switching speed, fault behaviour. It includes all phases currently on and off. To clarify, the phases currently not available for modulation are typically in tri-state mode and are not included here. The available phases are a subset of the total phases.

Active phases: An active phase is a phase with its control signal on. This is a subset of the currently available phases.

Modulation state: The output of the respective phases required modulation during the subcycle. It is on at the beginning of the subcycle and is turned of during the subcycle.

Subcycle: Time interval between the switching actions of two consecutive phases in a multi-phase power converter. For example, a four-phase converter has four different subcycles.

The embodiments in the invention described with reference to the drawings comprise of a computer apparatus and/or processes performed in a computer apparatus. However, the invention also extends to computer programs, particularly computer programs stored on or in a carrier adapted to bring the invention into practice. The program may be in the form of source code, object code, or a code intermediate source and object code, such as in partially compiled form or in any other form suitable for use in the implementation of the method according to the invention. The carrier may comprise of a storage medium such as ROM, e.g. CD ROM, or magnetic recording medium, e.g. a floppy disk or hard disk. The carrier may be an electrical or optical signal which may be transmitted via an electrical or an optical cable or by radio or other means.

In the specification the terms "comprise, comprises, comprised and comprising" or any variation thereof and the terms include, includes, included and including" or any variation thereof are considered to be totally interchangeable and they should all be afforded the widest possible interpretation and vice versa.

The invention is not limited to the embodiments described but may be varied in both construction and detail.

The invention claimed is:

1. A multi-phase digital pulse width modulator adapted to operate over a plurality of modulator phases incorporating a duty cycle control and a number of subcycles; said modulator comprising a controller adapted to implement a distribution scheme which controls a duty cycle and number of switching actions per phase and switching cycle by taking a number of available phases into account, wherein each available phase is adapted to switch up to twice per switching cycle, such that only a next available phase in a next subcycle is additionally turned 'on', and if a phase is still on at the end of a subcycle, the phase is kept 'on', if required, wherein the controller comprises of input logic, a one-phase finite-state-machine per each controlled phase, a cyclic-counter unit, and a timing block.

2. A multi-phase digital pulse width modulator as claimed in claim 1, wherein the controller is adapted to modulate switching signals according to a duty cycle input command, their previous switching states, and a current switching subcycle.

3. A multi-phase digital pulse width modulator as claimed in claims 1, wherein the controller takes into account a dynamically changing number of available phases.

4. A multi-phase digital pulse width modulator as claimed in claim 1, wherein the controller is adapted to additionally take residue of a previous subcycle into account.

5. A multi-phase digital pulse width modulator as claimed in claim 1, wherein the controller is adapted to apply duty cycle commands such that a last phase turned on is preferred.

6. A multi-phase digital pulse width modulator as claimed in claim 1, wherein the controller is adapted to apply duty cycle commands such that a last phase turned on is preferred and wherein the phase before a next previous phase remains active only if the entire subcycle period of the last previous phase is used.

7. A multi-phase digital pulse width modulator as claimed in claim 1, wherein the controller is adapted to turn on more than one phase at a start of each subcycle, if it can be ensured that these phases are kept on to avoid an additional switch off and on in the same cycle.

8. A multi-phase digital pulse width modulator as claimed in claim 1, wherein the controller is adapted to turn on more than one phase at a start of each subcycle, if it can be ensured that these phases are kept on to avoid an additional switch off and on in a same cycle the controller is adapted to turn on two phases if it can be ensured that a second turned on phase is kept on until the start of the next subcycle.

9. A multi-phase digital pulse width modulator as claimed in claims 8, wherein the controller is adapted to turn on N phases at the start of a subcycle, if it can be ensured that Nth turned on phase is kept on until the start of a next (N−1) subcycle.

10. A multi-phase digital pulse width modulator as claimed in claim 1, wherein the input logic, according to the number of available phases, ensures a normalization of an input signal; and wherein the input logic computes intermediate values required by the finite state machines, wherein the intermediate values comprise a separation of the duty cycle into a number of full subcycles and a high resolution modulation signal based on the number of available phases.

11. A multi-phase digital pulse width modulator as claimed in claim 10, wherein all of the finite state machines are executed at a start of each subcycle to evaluate a current situation and take appropriate action, and each of the finite state machines can change its state at a beginning of a subcycle.

12. A multi-phase digital pulse width modulator as claimed in claim 10, wherein all of the finite state machines are executed at a start of each subcycle to evaluate a current situation and take appropriate action, and each of the finite state machines can change its state at a beginning of a subcycle, if the phase is in a modulation state (Mod), an output is modulated with an auxiliary high-resolution DPWM module which is shared among all phases.

13. A multi-phase digital pulse width modulator as claimed in claim 1 wherein the subcycle is defined by a time interval between the switching actions of two consecutive phases in a multi-phase power converter.

14. A multi-phase digital pulse width modulator as claimed in claim 1 wherein said modulator is adapted to cooperate with a comb filter.

15. A switched mode power supply comprising of switches and a multi-phase digital pulse width modulator as claimed in claim 1 controlling the switches wherein the switch mode power supply is a multi-phase buck converter.

16. A controller for use in a multi-phase digital pulse width modulator comprising of a plurality of modulator phases incorporating a duty cycle control, operating over a number of subcycles; said controller adapted to implement a distribution scheme which controls a duty cycle and number of switching actions per phase and switching cycle by taking a number of available phases into account, wherein each available phase is adapted to switch up to twice per switching cycle, such that only a next available phase in a next subcycle is additionally turned 'on', and if a phase is still on at the end of a subcycle, the phase is kept 'on', if required, wherein the controller comprises of input logic, a one-phase finite-state-machine per each controlled phase, a cyclic-counter unit, and a timing block.

* * * * *